United States Patent
Herzog

(10) Patent No.: US 7,490,743 B2
(45) Date of Patent: Feb. 17, 2009

(54) DISPENSER ASSEMBLY

(76) Inventor: Kenneth J Herzog, 56 Shinnecock Rd., Hampton Bays, NY (US) 11946

( * ) Notice: Subject to any disclaimer, the term of this patent is extended or adjusted under 35 U.S.C. 154(b) by 0 days.

(21) Appl. No.: 10/971,516

(22) Filed: Oct. 22, 2004

(65) Prior Publication Data

US 2006/0086759 A1    Apr. 27, 2006

(51) Int. Cl.
   *B65D 88/54*    (2006.01)
   *B67D 5/40*    (2006.01)
(52) U.S. Cl. .................. 222/321.7; 222/382; 222/464.1
(58) Field of Classification Search ... 222/321.1–321.9, 222/464.1–464.7, 378–383.1, 211, 136, 207, 222/137; 239/305, 308
   See application file for complete search history.

(56) References Cited

U.S. PATENT DOCUMENTS

| | | | | |
|---|---|---|---|---|
| 2,690,278 | A * | 9/1954 | Flavius | 222/207 |
| 3,561,648 | A | 2/1971 | Humphrey | 222/207 |
| 5,152,431 | A * | 10/1992 | Gardner et al. | 222/136 |
| 5,246,146 | A | 9/1993 | Bartimes et al. | 222/382 |
| 5,303,851 | A * | 4/1994 | Libit et al. | 222/207 |
| 5,433,350 | A * | 7/1995 | Graubart | 222/136 |
| 5,464,129 | A * | 11/1995 | Ho | 222/377 |
| 5,494,199 | A * | 2/1996 | Anderson et al. | 222/464.1 |
| 5,611,463 | A * | 3/1997 | Favre | 222/137 |
| 5,638,994 | A * | 6/1997 | Libit et al. | 222/207 |
| 6,168,050 | B1 | 1/2001 | Battegazzore | 222/207 |

FOREIGN PATENT DOCUMENTS

WO    WO 00/12403 A1    3/2000

* cited by examiner

*Primary Examiner*—Kevin P Shaver
*Assistant Examiner*—Stephanie E Tyler
(74) *Attorney, Agent, or Firm*—Ostrolenk, Faber, Gerb & Soffen, LLP

(57) ABSTRACT

A dispenser assembly is provided. The dispenser assembly includes a container having a bottom, an open top and a side wall extending between the bottom and the open top, and a mating arrangement, the side wall having an inner surface; at least one container passageway mounted on the inner surface of the side wall and extending from the open top of the container to a position proximate to the bottom of the container; and a pump cap having a cap body, a pump mechanism arranged within the cap body, a pump cap passageway coupled to the pump mechanism, and a coupling arrangement arranged on the pump cap body and configured to detachably couple to the mating arrangement of the container such that the container passageway aligns with and sealingly engages the pump cap passageway in a fluid connection when the pump cap is mounted to the container. In this manner, the dispenser permits a fluid arranged within the container to flow through the container passageway and the pump cap passageway when the pump mechanism of the pump cap is activated.

19 Claims, 6 Drawing Sheets

DISPENSER ASSEMBLY

FIELD OF THE INVENTION

The present invention relates to a liquid and a semi-liquid product dispensing assembly with a pump cap and a bottle on which the cap is mounted.

BACKGROUND OF THE INVENTION

Container and pump assemblies for products such as liquid soaps which are pumped, as well as products which are sprayed, such as household cleaners, hair spray and perfumes, etc. are known. Such conventional assemblies include a container having a neck and a pump connected to the neck. The pump has an elongated pick-up tube that extends down into the container for pulling up the liquid product stored within the container when the pump is operated. A problem with the prior art assemblies is that the pick-up tube is carried by the pump and the tube is of a length that it reaches the bottom of the container. As a result, when the pump is mounted on the container it must first be placed in an elevated position with the lower end of the pick-up tube above the entrance to the container mouth, after which the pump assembly must then be lowered and mounted to the container. This makes assembling the pump with the container a relatively slow process.

In another type of assembly, as taught by U.S. Pat. No. 5,246,146, the pick-up tube is molded as an integral part of the container. The problem with this type of construction is that it allows the pump cap to only be mounted in a single orientation relative to the container.

SUMMARY OF THE INVENTION

Accordingly, it is an object of the present invention to provide a pump cap and container which avoid the problems mentioned above in connection with the prior art.

Pursuant to this object, and others which will become apparent hereafter, one aspect of the present invention resides in a pump cap and container assembly having a container with a bottom, an open top end and a side wall that extends between the bottom and the top. At least one passage member, such as a tube, is mounted on the side wall so as to extend from the top of the container substantially to the bottom of the container. The pump cap includes a pump and is mounted to the top of the container so that the pump is in fluid communication with the passage member.

In another embodiment of the invention, the pump cap has a tube with a first end connected to the pump and a second, free end that is dimensioned to sealingly engage with the upper end of the passage member that protrudes from the top of the container.

In yet another embodiment of the invention, the container has a peripherally extending groove in its outer surface in the region of the open top. The pump cap has a body with an open bottom and a side wall extending from the open bottom to a top of the cap body. The inner surface of the cap side wall has a peripherally extending notch in a region of the open bottom. The notch is configured to engage in the groove of the container so as to hold the cap on the container.

Rather than having tubes, in still a further embodiment of the invention, the passage member is a cylindrical member coaxial to the container and having an outer circumferential wall mounted to an inner surface of the container side wall and an inner wall mounted to the outer wall by intermittently spaced bracing members.

Instead of the groove and notch arrangement, another embodiment of the invention provides an external thread at the top end of the container and an internal thread at the bottom end of the cap so that the cap can be mounted to the container by engagement of the threads.

In still another embodiment of the invention, the passage member includes an annular trough mounted at the top of the container. A tube has a first end connected to the base of the trough and a second end that extends to substantially the bottom of the container. The pump cap has an annular inverted trough arranged within the cap in the region of the open bottom thereof. The inverted trough is dimensioned so as to fit over the trough of the container when the pump cap is mounted on the container. A conduit connects the pump and the inverted trough when the pump is in fluid communication with the inverted trough.

The container and the cap can have any desired cross section which are complimentary to one another to allow the cap to be mounted to the top of the container.

The construction according to the invention in which the passage member or tube is not initially connected to the pump cap allows for easier assembly of the pump cap to the container due to the reduced working space required.

Other features and advantages of the present invention will become apparent from the following description of the invention which refers to the accompanying drawings.

BRIEF DESCRIPTION OF THE DRAWING(S)

DETAILED DESCRIPTION

Figure 1:
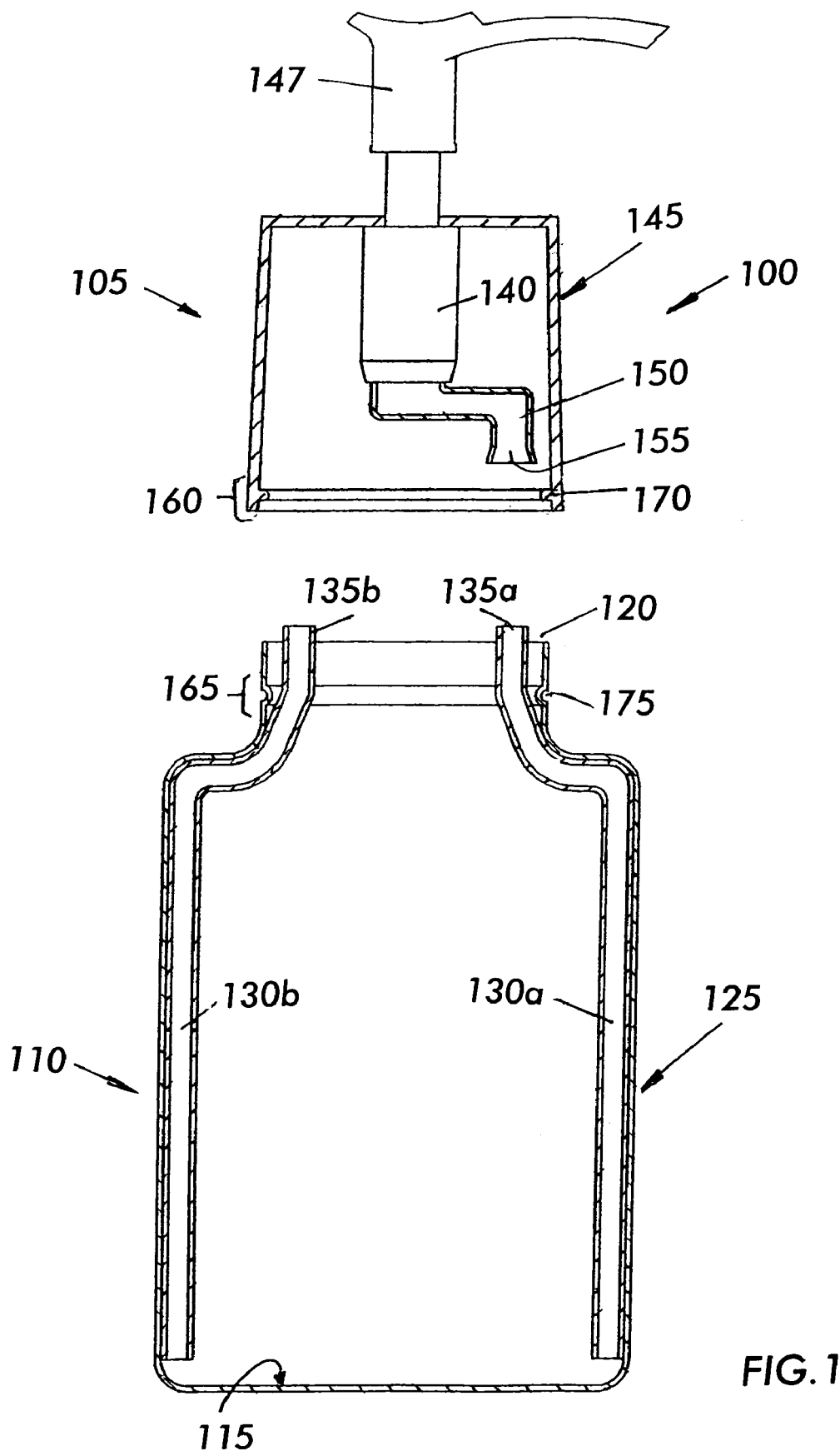
FIG. 1 is a cross-sectional exploded view of a first exemplary dispenser assembly according to the present invention.

Referring to FIG. 1, there is seen a cross-sectional view of a first exemplary dispenser assembly 100 according to the present invention. Dispenser assembly 100 includes a pump cap 105 and a container 110 configured to sealingly engage with the pump cap according to the present invention to dispense a liquid enclosed within container 110.

Container 110 includes a bottom 115, an open top 120, and a side wall 125 disposed between and formed integrally with open top 120 and bottom 115. It should be appreciated that side wall 110 need not be formed integrally with open top 120 and bottom 115, but rather may be formed of a separate piece that is coupled, attached, or otherwise bonded to open top 120 and bottom 115. It should also be appreciated that container 110 may have any desired shape, such as square, oval, round, triangular, etc.

At least one passageway 130 is mounted to the inner surface of side wall 125 and extends from open top 120 to a position proximate bottom 115 of container 110. In the exemplary embodiment illustrated in FIG. 1, container 110 includes two passageways 130a, 130b extending from open top 120 to a position proximate bottom 115 on opposite sides of side wall 125, with upper ends 135a, 135b of the passageways 130a, 130b extending slightly above the upper edge of open top 120 so that upper ends 135a, 135b may sealingly mate with corresponding passageways of pump cap 105, as more fully described below. It should be appreciated, however, that passageways 130a, 130b need not be arranged on opposite sides of side wall 125, but rather may be arranged on the same side, adjacent sides, or at any position around the inner perimeter of side wall 125. It should also be appreciated that any number of passageways 130 may be mounted to the inner surface of side wall 125 (e.g., one passageway, three passageways, four passageways, etc.).

Figure 2:
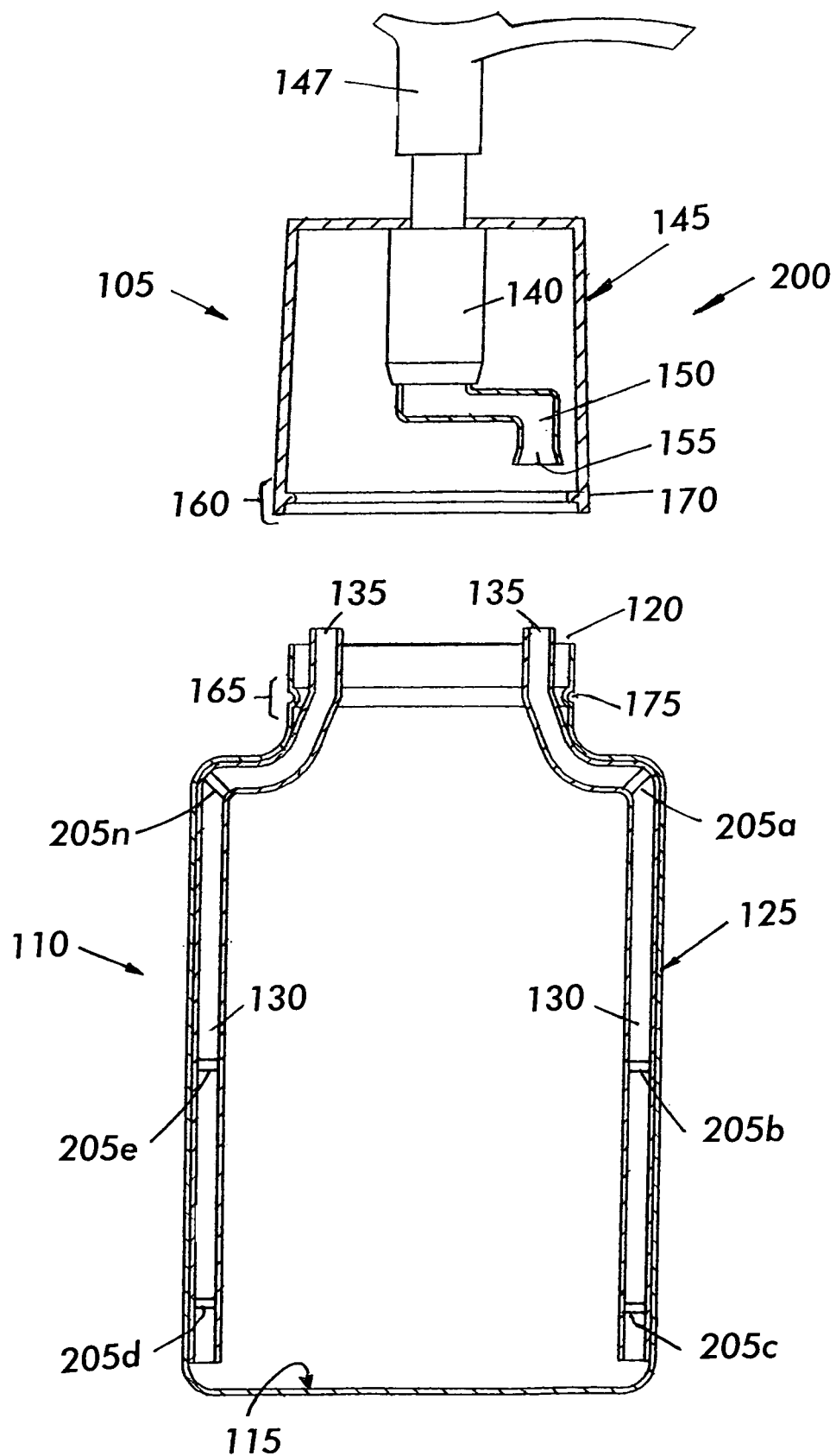
FIG. 2 is a cross-sectional exploded view of a second exemplary dispenser assembly according to the present invention.
Figure 3A:
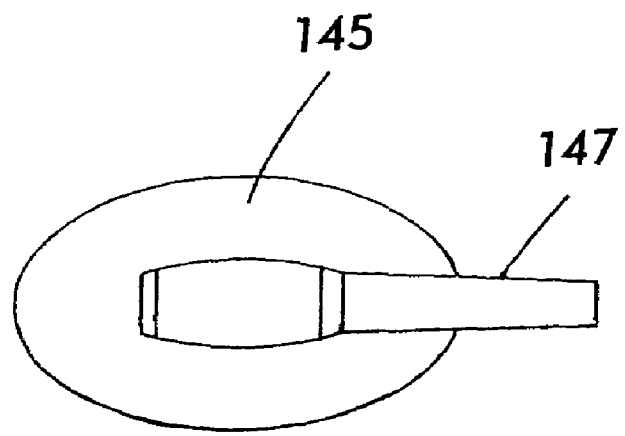
FIGS. 3A and 3B show top and sectional views, respectively, of a first exemplary pump cap according to the present invention.
Figure 3B:
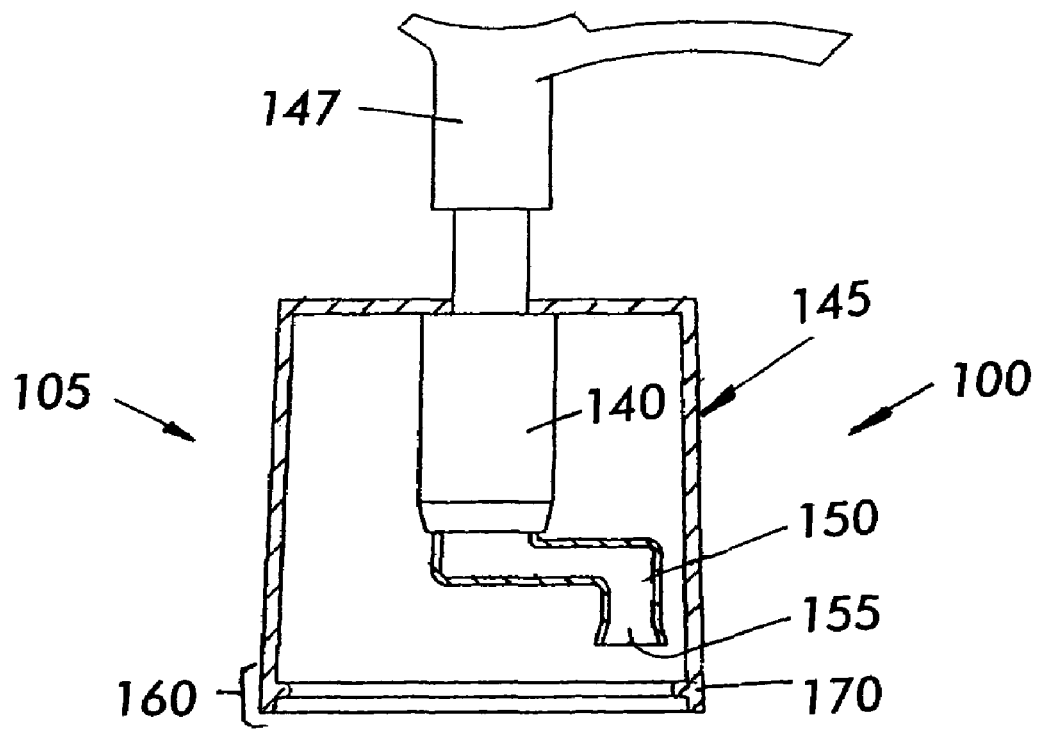

It is also possible for passageway 130 to be a single passageway that is coaxial with container 110. In this regard, FIG. 2 illustrates a cross-sectional view of another exemplary dispenser assembly 200 according to the present invention, in which container 110 includes a single concentric and coaxial passageway 130. In this configuration, the outer wall of the passageway 130 is fastened to or formed by the interior surface of side wall 125 of container 110. The inner wall of passageway 130 is at a distance from the outer wall of passageway 130 so that container 110 essentially has a double wall configuration. The bottom of passageway 130 is open with respect to bottom 115 of container 110 so that the liquid contained within container 110 can be pumped between passageway 130 and the inner surface of side wall 125 into pump cap 105, in a manner more fully described below. The inner wall may be formed integral with side wall 125 or, for example, may be attached by a number of intermittently arranged braces 205a, 205b, 205c, . . . , 205n that hold the inner wall in place but do not block the liquid passage between passageway 130 and the inner surface of side wall 125.

As shown in FIGS. 1, 2, 3A, and 3B pump cap 105 includes a cap body 145, a conventional pump mechanism 140 arranged within cap body 145, and a pump nozzle 147 extending through the top of cap body 145 and operatively coupled to pump mechanism 140 for dispensing a liquid enclosed within container 110. At least one passageway 150 extends from the bottom of pump mechanism 140 toward the open end of the cap body 145 facing container 110. The open end 155 of the passageway 150 is dimensioned so as to sealingly engage with an upper end 135 of a corresponding passageway 130 of container 110 when pump cap 105 is secured to open top 120 of container 110, in a manner more fully described below. For this purpose, open end 155 of passageway 150 may flange outwardly to have a larger diameter than that of upper end 135 of passageway 130, as shown in FIG. 1. To improve the sealing engagement between open end 155 of passageway 150 and upper end 135 of passageway 130, open end 155 of passageway 150 may be constructed from an elastic and/or flexible material (e.g., rubber, silicon, soft plastic, and/or any combination of these materials). Alternatively, open end 155 of passageway 150 may be fitted with an elastic and/or flexible insert (not shown), such as a rubber O-ring, operable to sealingly engage with upper end 135 of passageway 130 of container 110 when pump cap 105 is secured to open top 120 of container 110.

It should be appreciated that pump cap 105 may include any number of passageways 150 for sealing engaging respective passageways 130 of container 110. For example, pump cap 105 may include two passageways (not shown) configured to sealing engage with two corresponding passageways 130a, 130b of container 110. Alternatively, as shown in FIG. 1, pump cap 105 may include a single passageway 150 configured to sealing engage with a corresponding passageway 130 of container 110.

Cap body 145 includes a coupling arrangement 160 configured to detachable couple with a corresponding mating arrangement 165 arranged on container 110. In the exemplary embodiment illustrated in FIG. 1, coupling arrangement 160 of cap body 145 includes an annular tab 170 that extends around the entire inner periphery of cap body 145. Mating arrangement 165 of container 110 includes an annular groove 175 extending around the entire outer circumference of container 110 in an area adjacent to open top 120. When pump cap 10S is mounted to open top 120 of container 110, annular tab 170 of coupling arrangement 160 of cap body 145 engages with annular grove 175 of mating arrangement 165 of container 110, thereby detachably coupling pump cap 105 to container 110. When properly mounted to container 110, open end 155 of passageway 150 sealingly engages with upper end 135 of passageway 130. In this manner, a continuous conduit is formed to permit the liquid contained within container 110 to flow upwards through passageway 130, through passageway 150, and out through pump nozzle 147 when pump mechanism 140 is activated by a user. Since coupling arrangement 160 and mating arrangement 165 of the exemplary dispenser 100 of FIG. 1 are oval shaped, pump cap 105 is configured to detachably couple to container 110 in only one of two positions, so that open end 155 of passageway 150 sealingly engages with one of passageways 130a, 130b. As can be seen in FIG. 1, pump cap is orientated such that open end 155 of passageway 150 will sealingly engage with upper end 135a of passageway 130a when pump cap 105 is mounted to container 110. However, it should be appreciated that pump cap 105 may be oriented to align open end 155 of passageway 150 with upper end 135b of passageway 130b when pump cap 105 is mounted to container 110 by rotating pump cap 105 with respect to container 110 180 degrees before mounting pump cap 105 to container 110.

As described above, in the exemplary embodiment illustrated in FIG. 1, the oval shape of the coupling and mating arrangements 160, 165 permits pump cap 105 to be detachably coupled to container 110 in only one of two positions, so that open end 155 of passageway 150 sealingly engages with one of passageways 130a, 130b. However, it should be appreciated that, although FIG. 1 shows oval-shaped coupling and mating arrangements 160, 165, coupling and mating arrangements 160, 165 may be of any shape that permits a "keying" of coupling arrangement 160 with mating arrangement 165, such that open end 155 of passageway 150 sealingly engages with at least one of passageways 130a, 130b. For example, coupling and mating arrangements 160, 165 may be rectangularly-shaped, triangularly-shaped, irregularly-shaped, etc. It should also be appreciated that additional structures may be incorporated into either or both of the coupling and mating arrangements 160, 165 to permit pump cap 105 to be detachably coupled to container 110 in only one position, rather than two positions. For example, coupling arrangement 160 may include a projection (not shown) structured to communicate with a corresponding groove (not shown) of mating arrangement 165 to ensure that oval-shaped coupling arrangement 160 is coupleable to mating arrangement 165 in only one position. For example, with respect to the exemplary embodiment illustrated in FIG. 1, if cap body 145 were rotated by 180 degrees, the groove of mating arrangement 165 would not align with the projection of coupling arrangement 160, thereby preventing coupling arrangement 160 from coupling to mating arrangement 165.

It should also be appreciated that the components of the coupling and mating arrangements 160, 165 may be switched and/or interchanged. For example, mating arrangement 165 may include the annular tab 170 and coupling arrangement 160 may include the annular groove 175. In lieu of or in addition to the notch/groove and threaded arrangements discussed above, it should also be appreciated that coupling and mating arrangements 160, 165 may include any mechanism, device, construction, and/or shape that permits pump cap 105 to be detachably coupled to container 110. For example, coupling arrangement may include external or internal threads configured to engage with corresponding screw threads on container 110 when pump cap 105 is placed on top of container 110 and rotated. Alternatively, coupling and mating arrangements may include, for example, velcro, snaps, hooks, any combination of these elements, etc.

Figure 4:
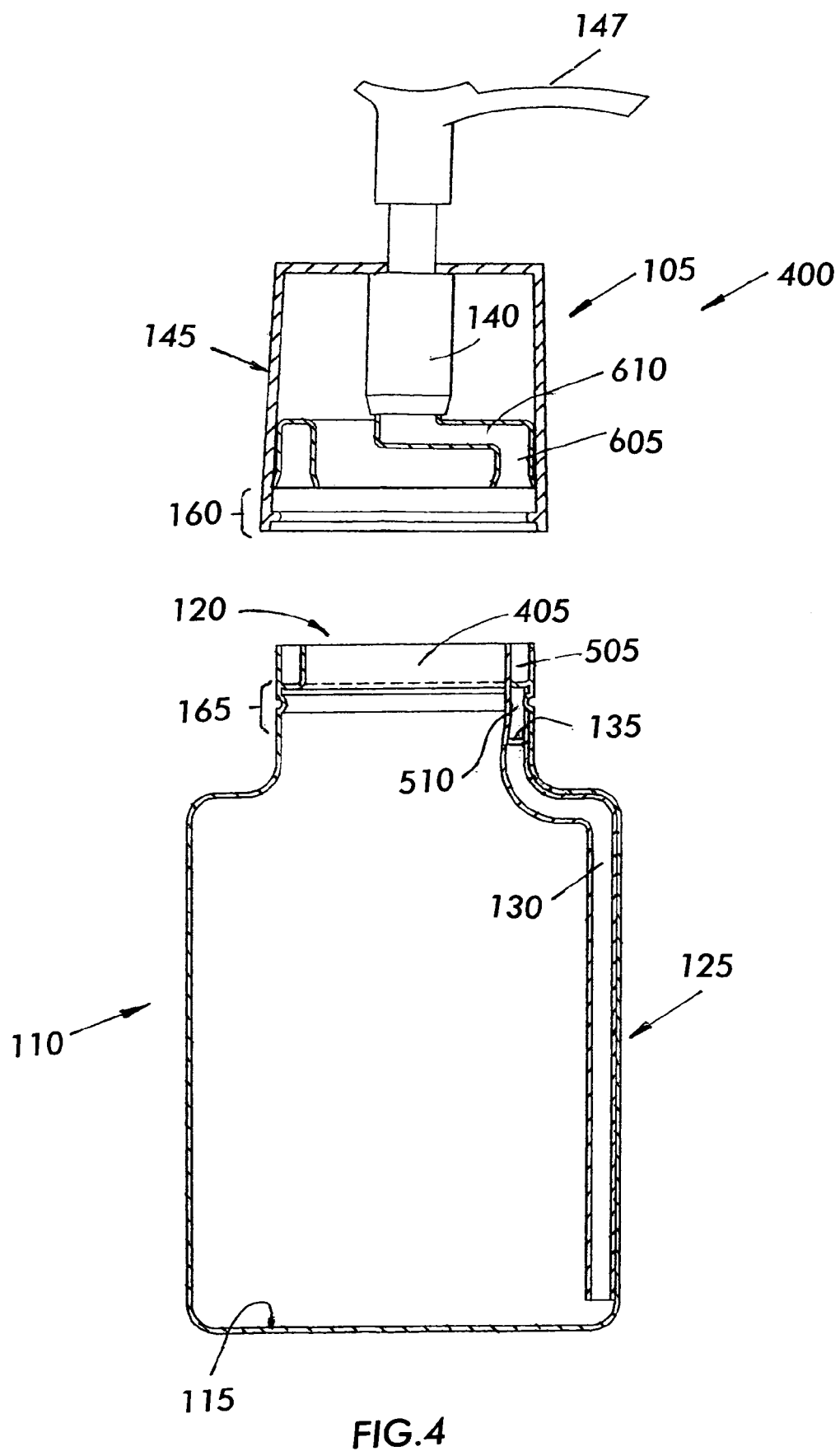
FIG. 4 is a cross-sectional view of a third exemplary dispenser assembly according to the present invention.

Referring now to FIG. 4, there is seen yet another exemplary dispenser assembly 400 according to the present invention. Dispenser assembly 400 is similar to dispenser assemblies 100, 200, except that dispenser assembly 400 includes a container 110 having a single passageway 130 and a trough member 405 formed integrally with or coupled to open top 120 of container 110. A perspective view of trough member 405 can be seen in FIG. 5. Trough member 405 has an annular channel 505 that is formed therein and an exit channel 510 formed integrally with or coupled to annular channel 505 in a manner that permits fluid to pass through exit channel 510 into annular channel 505. Exit channel 510 is, in turn, in fluid connection with passageway 130 to permit the liquid contained within container 110 to pass up through passageway 130, through exit channel 510, and into the annular channel 505 of trough member 405. It should be appreciated that exit channel 510 may be formed as an integral piece with passageway 130.

Figure 5:
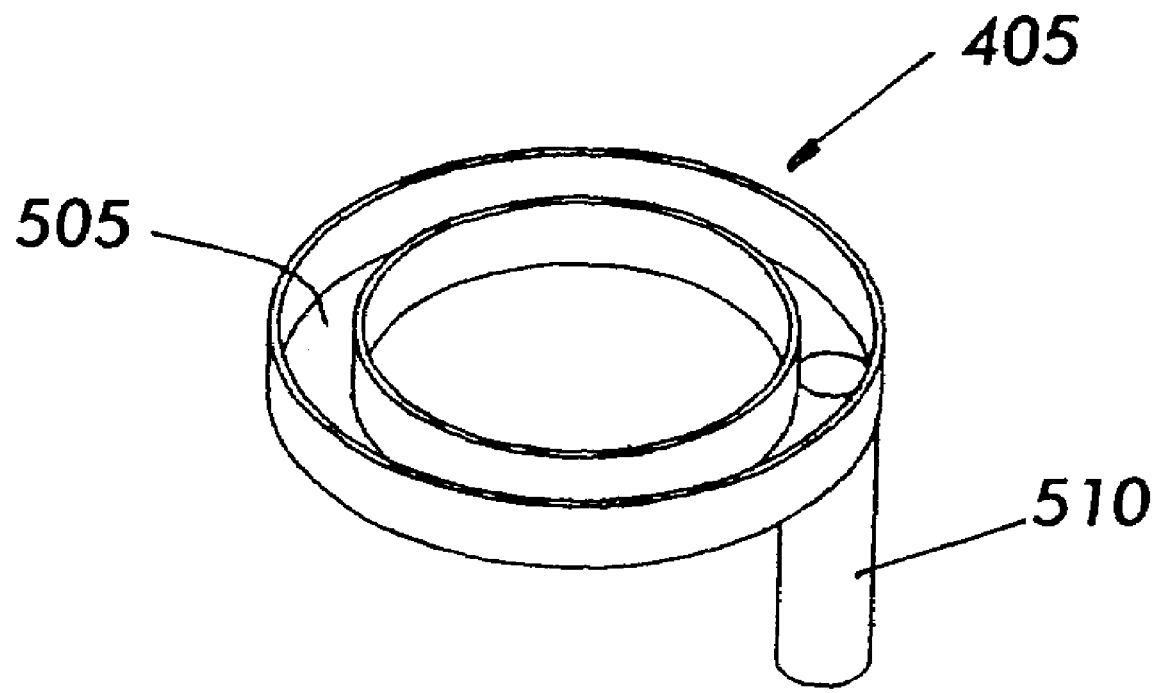
FIG. 5 is a perspective view of a trough member according to the present invention.

In the exemplary embodiment shown in FIGS. 4 and 5, trough member 405 is formed as a separate piece, which is configured to couple to container 110, as shown in FIG. 4. However, it should be appreciated that trough member 405 may be formed integrally with container 110 by any conventional method, such as by injection molding.

Figure 6A:
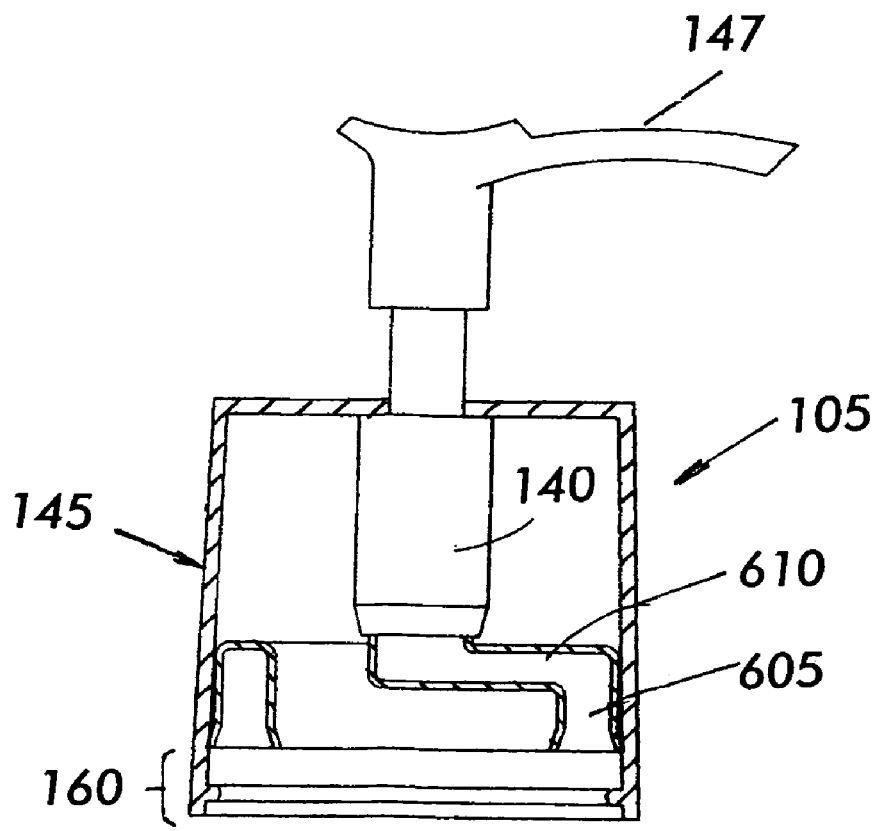
FIGS. 6A and 6B show bottom and sectional views, respectively, of a second exemplary pump cap according to the present invention.
Figure 6B:
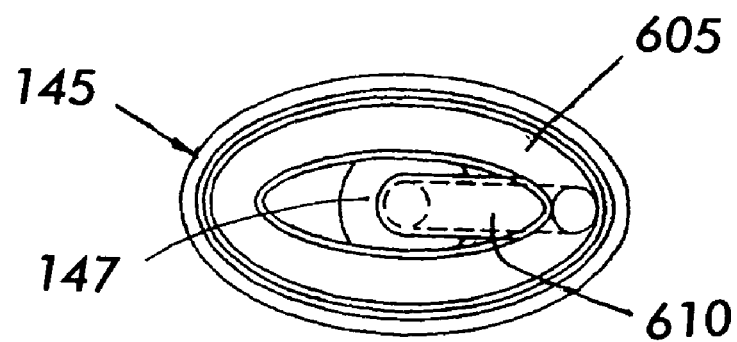

Pump cap 105 of dispenser assembly 400 is similar to pump cap 105 of dispenser assemblies 100, 200, except that pump cap 105 of dispenser assembly 400 includes a pump passage member 605 in fluid connection with pump mechanism 140 via a conduit 610, in lieu of passageway 150, as shown in FIGS. 4, 6A, and 6B. Passage member 605 may be formed, for example, as an inverted annular channel or trough arranged within cap body 145 so that the open side of pump passage member 605 faces downward. The open side of pump passage member 605 is dimensioned to sealingly couple with annular channel 505 of trough member 405 when pump cap 105 is secured to container 110.

When pump cap 105 is mounted to container 110, pump passage member 605 sealingly engages with annular channel 505 of trough member 405 so that when pump nozzle 147 is pushed, pump mechanism 140 is activated and causes suction through conduit 610. This causes the liquid within container 110 to flow up passageway 130, into exit channel 510, into annular channel 505, through pump passage member 605, through conduit 610, and into pump nozzle 147. Trough member 405 of dispenser assembly 400 permits pump cap 105 to be aligned with respect to container 110 in any rotational orientation, as both the annular channel 505 of trough member and pump passage member 605 are annularly symmetrical. In this manner, pump cap 105 may be mounted to container 110 in any orientation permitted by the shape of the pump cap and the container.

Although the preferred embodiment of the invention has been specifically illustrated and described herein, it is to be understood that minor variations may be made in the associated elements of the container and the pump unit without departing from the spirit and scope of the invention.

What is claimed is:

1. A dispenser assembly, comprising:
   a container having a bottom, an open top and a side wall extending between the bottom and the open top, and a mating arrangement, the side wall having an inner surface;
   at least one container passageway mounted on the inner surface of the side wall and extending from the open top of the container to a position proximate to the bottom of the container; and
   a pump cap having a cap body, a pump mechanism arranged within the cap body, a pump cap passageway coupled to the pump mechanism, wherein the pump passageway is non-axial relative to the pump mechanism, and a coupling arrangement arranged on the pump cap body and configured to detachably couple to the mating arrangement of the container, wherein the coupling arrangement and the mating arrangement are non-circular in shape such that the coupling arrangement and the mating arrangement are coupled only if the container passageway is aligned with the pump cap passageway, such that the container passageway sealingly engages the pump cap passageway in a fluid connection when the pump cap is mounted to the container;
   wherein a fluid arranged within the container flows through the container passageway and the pump cap passageway when the pump mechanism of the pump cap is activated.

2. The dispenser assembly of claim 1, wherein the pump cap passageway has an open end with a diameter greater than a diameter of the container passageway, the open end of the pump cap passageway receiving the container passageway when the pump cap is mounted to the container.

3. The dispenser assembly of claim 2, wherein the open end of the pump cap passageway is made of at least one of an elastic and a flexible material to improve the sealing engagement between the pump cap passageway and the container passageway.

4. The dispenser assembly of claim 2, wherein the pump cap passageway further includes an insert constructed from at least one of an elastic and a flexible material to improve the sealing engagement between the pump cap passageway and the container passageway.

5. The dispenser assembly of claim 4, wherein the insert includes an O-ring.

6. The dispenser assembly of claim 1, wherein the container passageway protrudes from the open top of the container to facilitate the sealing engagement with the pump cap passageway when the pump cap is mounted to the container.

7. The dispenser assembly of claim 1, wherein the coupling arrangement includes an annular tab and the mating arrangement includes an annular groove, the annular tab of the pump cap engaging the annular grove of the container when the pump cap is mounted to the container.

8. The dispenser assembly of claim 7, wherein the coupling arrangement includes a first screw thread and the mating arrangement includes a second screw thread, the first screw thread of the pump cap engaging the second screw thread of the container when the pump cap is rotated on top of the container to mount the pump cap to the container.

9. The dispenser assembly of claim 1, wherein the container passageway forms a cylindrical member that is coaxial with the container, the container passageway having an outer circumferential wall mounted to the inner surface of the side wall of the container so that the container passageway is coaxial with the container.

10. The dispenser of claim 9, further comprising a plurality of brace members to mount the container passageway to the inner surface of the side wall of the container.

11. A dispenser assembly, comprising:
a container having a bottom, an open top and a side wall extending between the bottom and the open top, and a mating arrangement, the side wall having an inner surface;
at least one container passageway mounted on the inner surface of the side wall and extending from the open top of the container to a position proximate to the bottom of the container; and
a pump cap having a cap body, a pump mechanism arranged within the cap body, a pump cap passageway coupled to the pump mechanism, and a coupling arrangement arranged on the pump cap body and configured to detachably couple to the mating arrangement of the container only if the container passageway is aligned with the pump cap passageway, such that the container passageway sealingly engages the pump cap passageway in a fluid connection when the pump cap is mounted to the container;
wherein a fluid arranged within the container flows through the container passageway and the pump cap passageway when the pump mechanism of the pump cap is activated; and
wherein the at least one container passageway includes a plurality of container passageways, the pump cap passageway sealingly engaging one of the container passageways in a fluid connection when the pump cap is mounted to the container.

12. The dispenser assembly of claim 11, wherein the pump cap passageway has an open end with a diameter greater than a diameter of the container passageway sealingly engaged with the pump cap passageway, the open end of the pump cap passageway receiving the container passageway when the pump cap is mounted to the container.

13. The dispenser assembly of claim 12, wherein the open end of the pump cap passageway is made of at least one of an elastic and a flexible material to improve the sealing engagement between the pump cap passageway and the container passageway.

14. The dispenser assembly of claim 12, wherein the pump cap passageway further includes an insert constructed from at least one of an elastic and a flexible material to improve the sealing engagement between the pump cap passageway and the container passageway.

15. The dispenser assembly of claim 14, wherein the insert includes an O-ring.

16. A dispenser assembly, comprising:
a container having a bottom, an open top and a side wall extending between the bottom and the open top, and a mating arrangement, the side wall having an inner surface;
at least one container passageway mounted on the inner surface of the side wall and extending from the open top of the container to a position proximate to the bottom of the container; and
a pump cap having a cap body, a pump mechanism arranged within the cap body, a pump cap passageway coupled to the pump mechanism, and a coupling arrangement arranged on the pump cap body and configured to detachably couple to the mating arrangement of the container only if the container passageway is aligned with the pump cap passageway, such that the container passageway sealingly engages the pump cap passageway in a fluid connection when the pump cap is mounted to the container;
wherein a fluid arranged within the container flows though the container passageway and the pump cap passageway when the pump mechanism of the pump cap is activated; and
wherein the coupling and mating arrangements are oval shaped.

17. The dispenser assembly of claim 16, wherein the coupling arrangement includes an annular tab and the mating arrangement includes an annular groove, the annular tab of the pump cap engaging the annular grove of the container when the pump cap is mounted to the container.

18. The dispenser assembly of claim 17, wherein the container passageway forms a cylindrical member that is coaxial with the container, the container passageway having an outer circumferential wall mounted to the inner surface of the side wall of the container so that the container passageway is coaxial with the container.

19. The dispenser of claim 18, further comprising a plurality of brace members to mount the container passageway to the inner surface of the side wall of the container.

* * * * *